(12) United States Patent
Nishimura et al.

(10) Patent No.: US 11,196,835 B2
(45) Date of Patent: Dec. 7, 2021

(54) DISPLAYING CONTEXT IN GROUP CHATS USING MEMBER TAGGING

(71) Applicant: International Business Machines Corporation, Armonk, NY (US)

(72) Inventors: Hirokazu Nishimura, Yokohama (JP); Munehiko Sato, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 908 days.

(21) Appl. No.: 15/401,187

(22) Filed: Jan. 9, 2017

(65) Prior Publication Data
US 2018/0198887 A1     Jul. 12, 2018

(51) Int. Cl.
*H04L 29/08*     (2006.01)
*H04L 12/58*     (2006.01)

(52) U.S. Cl.
CPC ............ *H04L 67/306* (2013.01); *H04L 51/04* (2013.01); *H04L 51/16* (2013.01); *H04L 51/18* (2013.01); *H04L 51/32* (2013.01)

(58) Field of Classification Search
CPC .................................................... H04L 67/306
See application file for complete search history.

(56) References Cited

U.S. PATENT DOCUMENTS

| | | | | |
|---|---|---|---|---|
| 10,002,117 B1* | 6/2018 | Ain | ........................ | G06F 17/241 |
| 2007/0174407 A1* | 7/2007 | Chen | ........................ | G06Q 10/10 |
| | | | | 709/207 |
| 2008/0068385 A1* | 3/2008 | Kim | ........................ | G06F 16/9577 |
| | | | | 345/472 |
| 2008/0228894 A1* | 9/2008 | Chen | ........................ | G06Q 10/10 |
| | | | | 709/207 |
| 2008/0263157 A1* | 10/2008 | Bhogal | ................ | G06Q 10/107 |
| | | | | 709/206 |
| 2012/0317499 A1 | 12/2012 | Shen | | |
| 2013/0262574 A1* | 10/2013 | Cohen | ................ | G06F 17/2765 |
| | | | | 709/204 |

(Continued)

FOREIGN PATENT DOCUMENTS

WO     2015109945 A1     7/2015

OTHER PUBLICATIONS

"Chat / Chat & Messenger," [online] retrieved Jan. 6, 2017, retrieved from the Internet: <http://chat-messenger.net/blog-entry-13.html#mention>, 4 pg.

*Primary Examiner* — Ario Etienne
*Assistant Examiner* — Sm Z Islam
(74) *Attorney, Agent, or Firm* — Cuenot, Forsythe & Kim, LLC

(57) ABSTRACT

Group chat communication can include receiving, using a processor, a first message in a group chat having members, wherein the first message is from a first member of the group chat and specifies a second member of the group chat, distributing, using the processor, the first message to the members of the group chat, and, in response to receiving the first message and using the processor, causing a group chat window of the second member to display a first callout. The group chat window of the second member is configured to display a plurality of chronologically ordered messages posted by the members of the group chat. The first callout identifies the first member and indicates a position of the first message within the plurality of chronologically ordered messages.

20 Claims, 10 Drawing Sheets

(56) References Cited

U.S. PATENT DOCUMENTS

| | | | | |
|---|---|---|---|---|
| 2014/0310357 A1* | 10/2014 | Banatwala | ............... | H04L 51/04 |
| | | | | 709/206 |
| 2015/0032686 A1* | 1/2015 | Kuchoor | ............... | G06F 17/241 |
| | | | | 707/608 |
| 2016/0344679 A1* | 11/2016 | Lane | ........................ | H04L 51/02 |
| 2017/0052686 A1* | 2/2017 | Edwards | ............. | G06F 3/04845 |
| 2017/0168692 A1* | 6/2017 | Chandra | ................. | G06F 3/017 |

* cited by examiner

DISPLAYING CONTEXT IN GROUP CHATS USING MEMBER TAGGING

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

This disclosure relates to group chat communication and, more particularly, to tagging a member of a group chat. Within a group chat, members of the group chat are able to reference other members of the group chat. As an illustrative example, a member of a group chat may create a message that includes the name or username of another member of the group chat. Typically, the reference includes a designated symbol prior to the name or username such as the "@" symbol. For example, a reference to a member called "userA" would be a message with the formative "@userA" contained therein.

The tagging of a member within the body of a message is also referred to as a "mention." The mention mechanism allows one member of a group chat, e.g., the member creating the message with the tag, to garner the attention of the tagged or mentioned member of the group chat. This feature can be particularly useful in cases where the group chat has a large number of members and not all members are continually monitoring the discussion.

Some group chat communication systems are adapted to display a list of mentions for a group chat. The list of mentions is typically displayed outside of the group chat window. For example, the list of mentions may be displayed within a different window than is used to display the messages of the group chat discussion itself. In many cases, providing a listing of mentions conveys little or no context as to where the mention occurs within the many messages displayed within the group chat window. In addition, members of the group chat are unable to discern whether issues raised by the mentions have been resolved.

SUMMARY

One or more embodiments are directed to methods of group chat communication. In one aspect, a method can include receiving, using a processor, a first message in a group chat having members, wherein the first message is from a first member of the group chat and specifies a second member of the group chat, distributing, using the processor, the first message to the members of the group chat, and, in response to receiving the first message and using the processor, causing a group chat window of the second member to display a first callout. The group chat window of the second member can display a plurality of chronologically ordered messages posted by the members of the group chat and a scroll control. The first callout is adapted to identify the first member and indicate a position of the first message within the plurality of chronologically ordered messages.

One or more embodiments are directed to systems for group chat communication. In one aspect, a system includes a processor configured to initiate executable operations. The executable operations can include receiving a first message in a group chat having members, wherein the first message is from a first member of the group chat and specifies a second member of the group chat, distributing the first message to the members of the group chat, and, in response to receiving the first message, causing a group chat window of the second member to display a first callout. The group chat window of the second member is configured to display a plurality of chronologically ordered messages posted by the members of the group chat. The first callout can identify the first member and indicate a position of the first message within the plurality of chronologically ordered messages.

One or more embodiments are directed to a computer program product for group chat communication. In one aspect, the computer program product includes a computer readable storage medium having program instructions embodied therewith. The program instructions are executable by a processor to cause the processor to initiate operations including receiving, using the processor, a first message in a group chat having members, wherein the first message is from a first member of the group chat and specifies a second member of the group chat, distributing, using the processor, the first message to the members of the group chat, and in response to receiving the first message and using the processor, causing a group chat window of the second member to display a first callout. The group chat window of the second member is configured to display a plurality of chronologically ordered messages posted by the members of the group chat. The first callout can identify the first member and indicate a position of the first message within the plurality of chronologically ordered messages.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
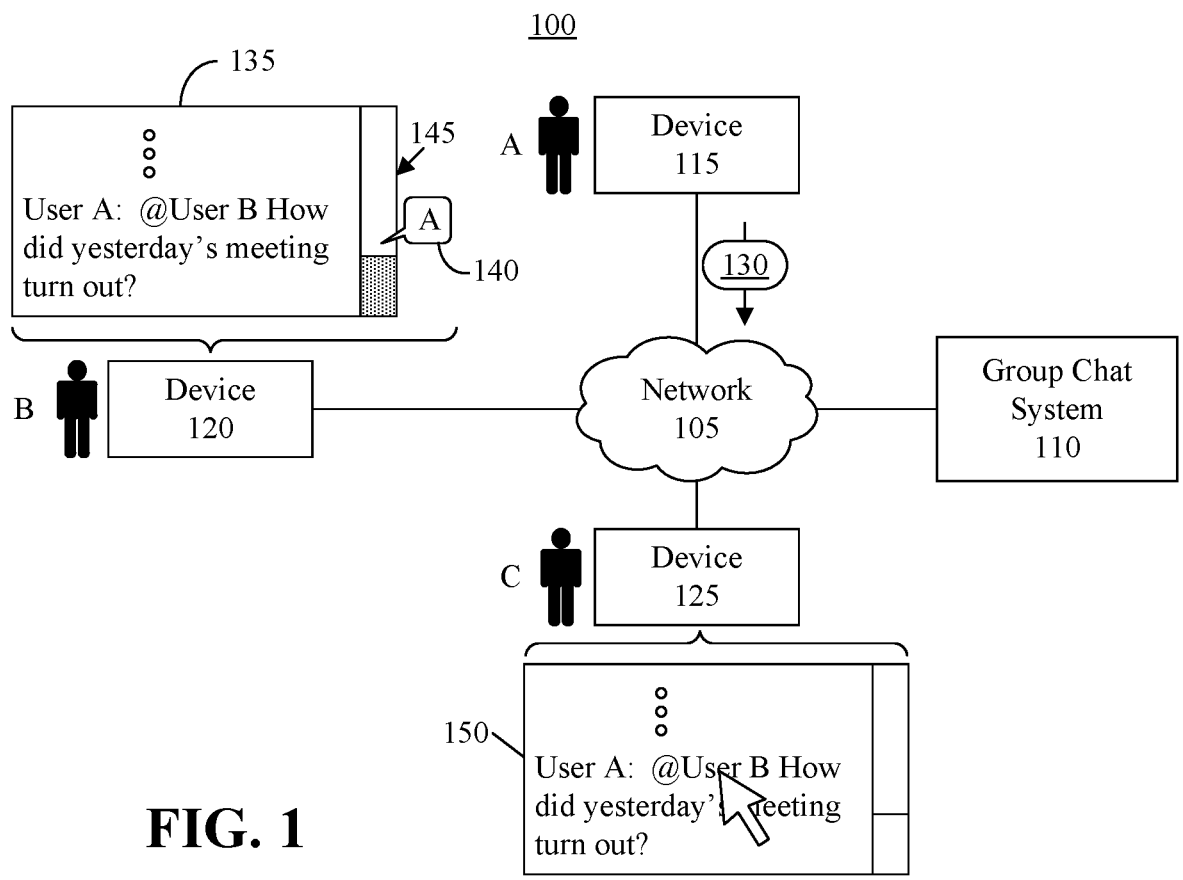
FIG. 1 illustrates an example of a network computing system.

While the disclosure concludes with claims defining novel features, it is believed that the various features described within this disclosure will be better understood from a consideration of the description in conjunction with the drawings. The process(es), machine(s), manufacture(s), and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to group chat communication and, more particularly, to tagging members of a group chat. In accordance with the inventive arrangements disclosed herein, a system is adapted to process messages of a group chat that include references to other members of the group chat. As discussed, a member of a group chat may be referenced within a message using a particular syntax such as appending a predetermined character or symbol prior to the name or username of the member.

The system is capable of processing messages of a group chat to recognize those messages from one member of the group chat that reference another member of the group chat. The reference may be through a tag as noted. For purposes of discussion, referencing a member of a group chat within the body of a message is referred to herein as "tagging" the member or as "mentioning" the member (e.g., a "mention"). In any case, the system is capable of causing a callout to be displayed through the device of the mentioned member. In one aspect, the callout is positioned on a scroll control of a group chat window of the mentioned user. The callout can indicate a position of the message of the group chat that includes the mention among the other messages of the group chat.

In one or more embodiments, the callout may be selected to allow the mentioned member to respond or reply to the member that initiated the mention (referred to herein as the "mentioning member"). In response, the system is capable of causing a further callout to be displayed through the device of the mentioning member. The callout may be positioned on a scroll control of a group chat window of the mentioning member. The callout can indicate the position of the message that includes the mention within the group chat discussion.

In one or more embodiments, the callouts may be used to provide user interface (UI) elements. A member may select the UI elements to provide responses and/or indicate a status of a particular conversation. The term conversation, as used herein, refers to a subset of messages of the group chat. A conversation is started with a message that includes a mention (hereafter the "mention message") and includes each other message generated in reply to the mention message or in the chain of messages that depend from the mention message. The system is capable of tracking the status of the conversation as open or closed, for example. As the status of the conversation is updated and/or changed, the system is capable of propagating the conversation status to the devices of the members of the group chat. The status of the conversation may be reflected in the callouts that are displayed within the various group chat windows of the members.

Further aspects of the embodiments described within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example of a network computing system 100 in which the inventive arrangements may be implemented. Network computing system 100 contains a network 105, a group chat system (system) 110, and devices 115, 120, and 125. The noted elements are interconnected, e.g., communicatively linked, by network 105.

Network 105 is the medium used to provide communication links between various devices and data processing systems connected together within network computing system 100. Network 105 may include connections, such as wired communication links, wireless communication links, or fiber optic cables. Network 105 may be implemented as, or include, one or more or any combination of different communication technologies such as a Wide Area Network (WAN), a Local Area Network (LAN), a wireless network (e.g., a wireless WAN and/or a wireless LAN), a mobile or cellular network, a Virtual Private Network (VPN), the Internet, the Public Switched Telephone Network (PSTN), and so forth.

System 110 is capable of coupling to network 105 via wired and/or wireless communication links. In one aspect, system 110 is implemented as one or more interconnected computer systems, e.g., servers. System 110 is capable of executing suitable operational software to support the various operations described herein. In general, system 110 is capable of receiving messages from users A, B, and/or C via devices 115, 120, and/or 125, respectively. System 110 is capable of processing the received messages, distributing the messages to members of the group chat, and performing additional operations to be described herein relating to processing mentions detected within the messages and updating conversation status.

Devices 115, 120, and 125 are capable of coupling to network 105 via wired and/or wireless communication links. Devices 115, 120, and 125 may be implemented as personal computers, portable computing or communication devices, network computers, tablet computers, mobile phones, or the like. Further, device 115 may be implemented as one type of device, while device 120 is implemented as another different type of device, while device 125 is implemented as yet another different type of device. Devices 115, 120, and 125 may exchange messages with one another through system 110.

As defined herein, the term "message," means any of a variety of electronic communications exchanged among devices, e.g., client devices, of members of a group chat session. The messages are capable of being sent and/or received through network 105. Messages of a group chat may be exchanged in real time. Messages within a group chat may be text messages, instant messages, short message service (SMS) messages, etc. A group chat session refers to a communication session involving the real time exchange of messages among more than two members. A "member" refers to a user that is participating or included in a group chat.

For purposes of illustration, user A, user B, and user C are members of a same group chat conducted by system 110. As pictured, user A interacts with system 110 via device 115. User B interacts with system 110 via device 120. User C interacts with system 110 via device 125. Within this disclosure, references to sending a message to a member, a member receiving a message, etc., are to be understood and interpreted as references to the operations performed by the respective device(s) of such member(s). Such operations may be performed in response to inputs received from users of such devices.

User A, within the group chat, composes message 130. Within message 130, user A references user B. For example, within the message, user A utilizes the "@" symbol prepended to the name or username of user B to tag or mention user B. As an illustrative example, the body of message 130 may be "@User B How did yesterday's meeting turn out?". Accordingly, message 130 is considered a "mention message" and the start of a conversation. System 110 is capable of receiving message 130 from device 115. System 110 is capable of distributing the message within the chat session to users A, B, and C. As such, message 130 is added to the list of messages of the group chat. For purposes of discussion, the list of chronologically ordered messages of the chat session is referred to as a transcript. The transcript may include the entirety of messages sent by members of the group chat.

In addition, system 110 is capable of detecting the mention, or tagging, of user B within message 130. Accordingly, system 110 is capable of instructing the group chat messaging application executing within device 120 to generate a callout 140. As pictured, in response to instructions from system 110, device 120, which displays group chat window 135 for user B, displays callout 140. Message 130, having been distributed by system 110, is displayed within group chat window 135.

Callout 140 is positioned on or above scroll control 145 of group chat window 135. Callout 140 is positioned at a location on scroll control 145 that indicates the location or position of message 130 within the transcript of the group chat. For example, group chat window 135 is capable of displaying the transcript for the group chat, or a portion of the transcript. The length of scroll control 145 maps onto the length of the transcript of the group chat. The transcript may be larger than the portion of the transcript displayed within group chat window 135. The position of callout 140 along scroll control 145 indicates the relative position of message 130 within the transcript, e.g., within the plurality of chronologically ordered messages of the group chat, as a location on scroll control 145.

User B may utilize callout 140 to respond to message 130 to continue the conversation between user A and user B started with message 130. Callout 140, for example, in response to a selection thereof by user B, may present one or more controls allowing user B to directly respond to message 130. The conversation started with message 130 which includes any response from user B, may be considered a subset of the messages or transcript of the group chat. The conversation includes fewer members than the total number of members of the group chat despite the distribution of messages of the conversation to all members of the group chat.

Referring to user C, device 125 displays group chat window 150. As pictured, message 130 is displayed in chronological order with other messages of the group chat within group chat window 150. No callout is shown for group chat window 150 since message 130 did not reference user C. Still, in one or more embodiments, user C is able to select the reference to user B, e.g., the tag. As an illustrative example, device 125 is capable of providing one or more options to user C in response to the selection of "@User B" within group chat window 150. The available options allow user C to respond to message 130 in a more direct way as will be described in greater detail herein.

Callouts may also be presented in the group chat window for user A. A callout within the group chat window for user A allows user A to continue the conversation started with message 130 or accept a reply to message 130 from user B or from user C. In general, by utilizing the callout, user A may indicate whether the conversation started by message 130 is open or closed. System 110 is able to detect the status of the conversation and propagate any changes in the status to user A, user B, and/or user C. In one aspect, status of a conversation may be indicated by callouts presented within the group chat window of each member of the group chat involved in the conversation.

Further details relating to the use and functionality of callouts as implemented using system 110 are described below with reference to the figures. In general, a callout is displayed and adapted to provide a variety of different functions. In one aspect, a callout is capable of providing one or more UI elements that a member may invoke to respond to a message that includes a mention directed to that member. In another aspect, a callout is adapted to specify a position of a mention message within the transcript of the group chat. A callout further is capable of specifying a status of a conversation.

As discussed, a conversation refers to a mention message and any message sent in reply or response to the mention message and/or another message in the chain or thread of messages starting from the mention message. After the mention message, each other message that is considered part of the conversation of the mention message is sent using the reply mechanisms disclosed herein. In this regard, a group chat session may include one or more different conversations that take place serially or concurrently among different subsets of members of the group chat, where each conversation starts from a different mention message. Thus, the callout is adapted to indicate status of a given conversation such as whether the conversation is open (e.g., unresolved), is closed (e.g., resolved), whether response messages have been posted, etc.

FIG. 1 is provided for purposes of illustration and is not intended to limit the inventive arrangements described herein. It should be appreciated that network computing system 100 may include fewer elements than shown or more elements than shown. For example, network computing system 100 may include fewer or more servers, clients, and other devices. In addition, one or more of the elements illustrated in network computing system 100 may be merged or combined.

Figure 2:
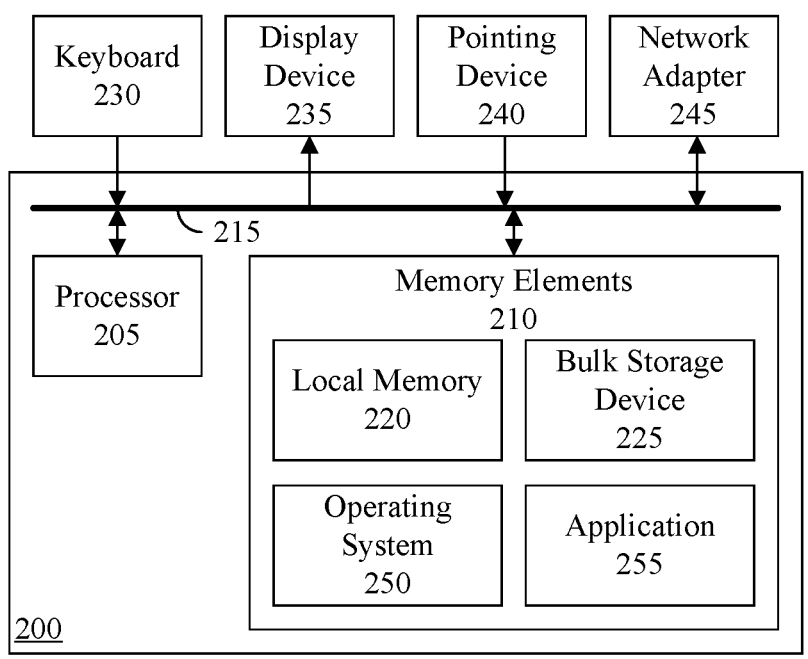
FIG. 2 illustrates an example architecture for a data processing system.

FIG. 2 illustrates an example architecture 200 for a data processing system. In one aspect, architecture 200 may be used to implement system 110 of FIG. 1. In another aspect, architecture 200 may be used to implement device 115, device 120, and/or device 125.

Architecture 200 includes at least one processor, e.g., a central processing unit (CPU), 205 coupled to memory elements 210 through interface circuitry 215. Architecture 200 stores program code within memory elements 210. Processor 205 executes the program code accessed from memory elements 210 via interface circuitry 215. In one aspect, architecture 200 is implemented as a computer or other data processing system that is suitable for storing and/or executing program code. It should be appreciated, however, that architecture 200 can be implemented in the form of any system including a processor and memory that is capable of performing the functions described within this disclosure.

Memory elements 210 include one or more physical memory devices such as, for example, a local memory 220 and one or more bulk storage devices 225. Local memory 220 refers to random access memory (RAM) or other non-persistent memory device(s) generally used during actual execution of the program code. Bulk storage device 225 may be implemented as a hard disk drive (HDD), solid state drive (SSD), or other persistent data storage device. Architecture 200 may also include one or more cache memories (not shown) that provide temporary storage of at least some program code in order to reduce the number of times program code must be retrieved from bulk storage device 225 during execution.

Examples of interface circuitry 215 include, but are not limited to, an input/output (I/O) subsystem, an I/O interface, a bus system, a memory interface, etc. For example, interface circuitry 215 may be one or more of any of several types of bus structures, including a memory bus or memory controller, a peripheral bus, an accelerated graphics port, and a processor or local bus using any of a variety of bus architectures. By way of example, and not limitation, such bus architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Input/output (I/O) devices such as a keyboard 230, a display device 235, a pointing device 240, a network adapter 245, etc., may optionally be coupled to architecture 200. The I/O devices may be coupled to architecture 200 either directly or through intervening I/O controllers. Network adapter 245 enables a system implemented using architecture 200 to become coupled to other systems, computer systems, remote printers, and/or remote storage devices through intervening private or public networks. Modems, cable modems, Ethernet cards, communication ports, and wireless transceivers are examples of different types of network adapter 245 that may be used with architecture 200.

Memory elements 210 store one or more program modules. The program modules may generally include routines, programs, objects, components, logic, data structures, and so on. For purposes of illustration, memory elements 210 are shown to store an operating system 250 and an application 255. Application 255, for example, may be a chat or group chat application. In one aspect, operating system 250 and application 255, being implemented in the form of executable program code, are executed by architecture 200 and, more particularly, by processor 205, to perform the various operations described within this disclosure. As such, operating system 250 and application 255 may be considered an integrated part of architecture 200.

Any data used, generated, and/or operated upon by a system using architecture 200 or an architecture similar thereto are functional data structures that impart functionality when employed as part of the system. A data structure refers to a physical implementation of a data model's organization of data within a physical memory. As such, a data structure is formed of specific electrical or magnetic structural elements in a memory. A data structure imposes physical organization on the data stored in the memory as used by a processor.

Architecture 200 may include fewer components than shown or additional components not illustrated in FIG. 2 depending upon the particular type of device that is implemented. In addition, the particular operating system and/or application(s) included may vary according to device type as may the types of network adapter(s) included. Further, one or more of the illustrative components may be incorporated into, or otherwise form a portion of, another component. For example, a processor may include at least some memory.

In the case where architecture 200 is used to implement a server type of data processing system such as system 110 of FIG. 1, operating system 250 may be a server-side operating system; and, application 255 may be a server-side application that, when executed, causes the server to perform the various operations described herein attributable to a group chat messaging system such as system 110. In the case where architecture 200 is used to implement a device such as device 115, 120, or 125 of FIG. 1, operating system 250 may be a client-side operating system; and, application 255 may be a client-side application that, when executed, causes the client to perform the various operations described herein attributable to a device used by a member of a chat group.

Figure 3A:
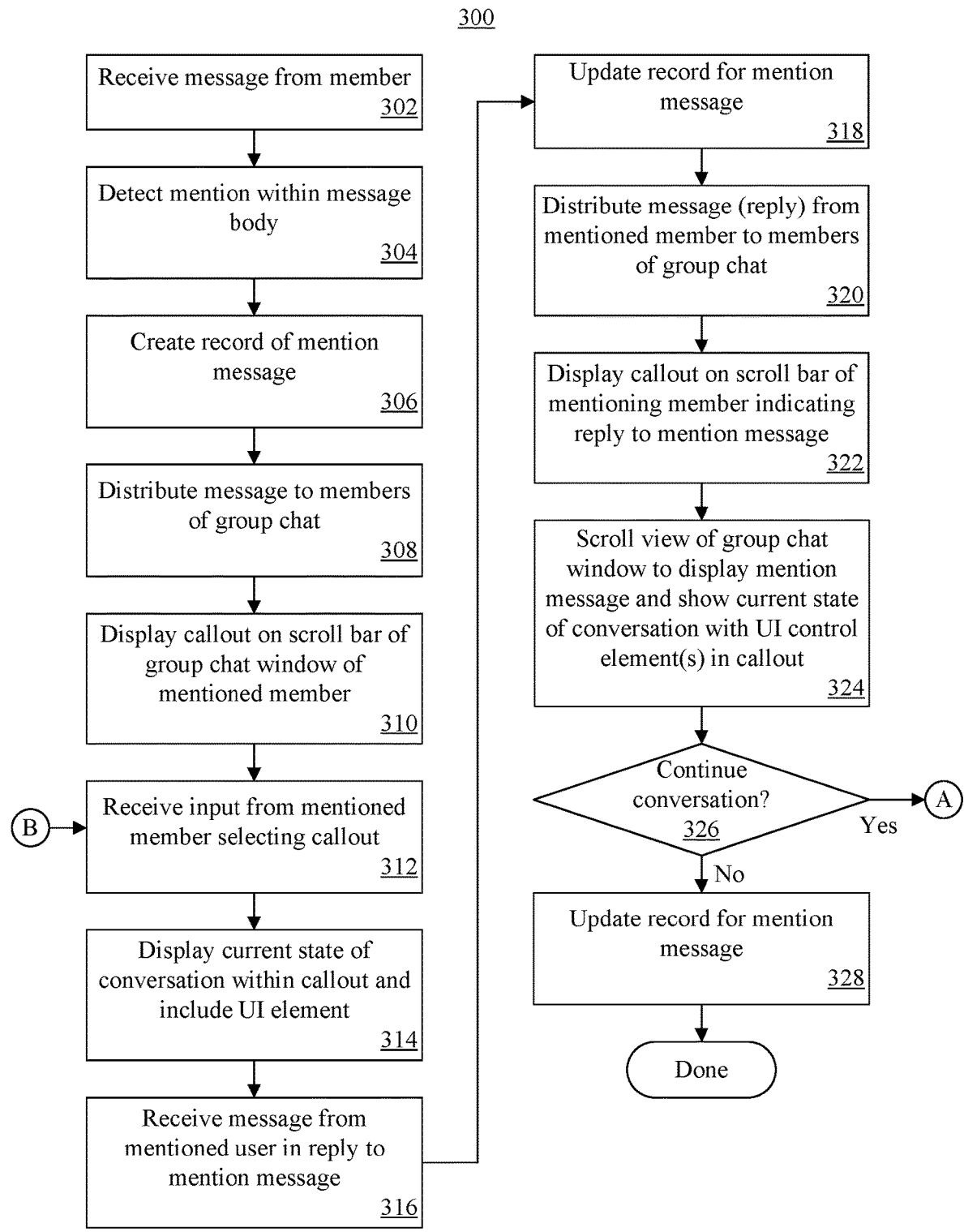
FIGS. 3A and 3B, taken collectively, illustrate a method of group chat using mentions.
Figure 3B:
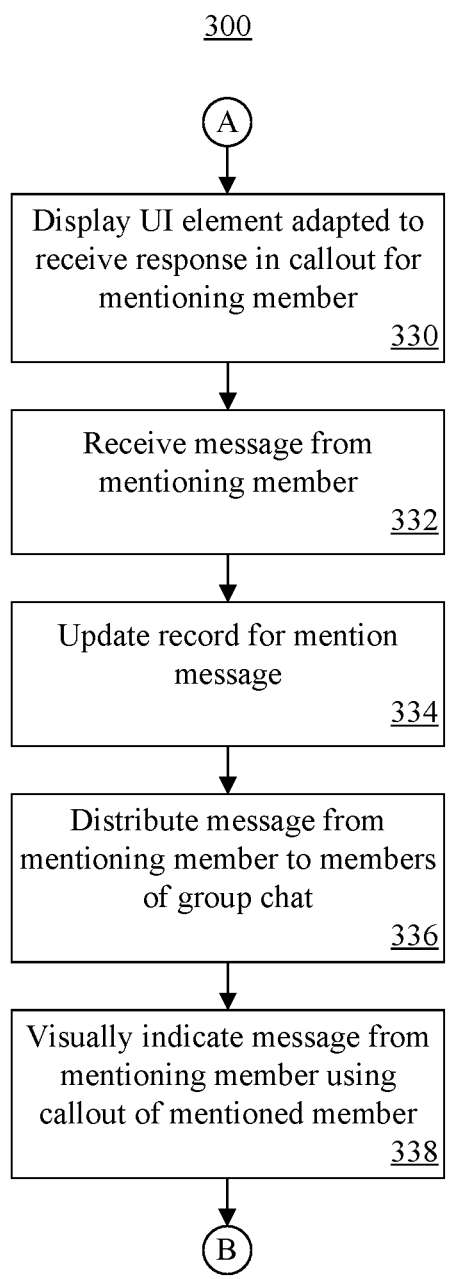

FIGS. 3A and 3B, taken collectively, illustrate a method 300 of group chat using mentions. FIGS. 3A and 3B are referred to collectively as FIG. 3. Method 300 may be performed by a system such as system 110 of FIG. 1. Method 300 may begin in FIG. 3A in a state where a plurality of members, e.g., users A, B, and C, are participating in a group chat.

In block 302, the system receives a message from a member. For example, the system receives a message from user A. In block 304, the system detects a mention within the body of the message received in block 302. For example, the message has a body that references user B. As an illustrative example, the message body may be "@User B How did yesterday's meeting turn out?". Accordingly, the message sent from user A specifying user B is a "mention message." In this example, the system determines that the message body includes the "@" designator for a mention followed by the name or username of a member of the group chat. It should be appreciated, however, that the mention indicator may be any of a variety of different symbols designated for the purpose of mentioning a member.

In block 306, the system creates a record of the mention message. The system stores the record in a memory for subsequent recall and use. Table 1 illustrates an example record that the system stores in block 306. As shown, the record includes an index number (beneath the @mention column heading), sender, recipient, message status, body of the message, timestamp of the message, and identifier (e.g., Float ID). The index may indicate the number of the mention within the group chat since the group chat may include more than one mention and ongoing conversation rooted in the mention message(s). Table 1 indicates that the message status is open. Further, the "blink" status indicates that the callout to be created for the mention message will blink as displayed within a group chat window.

TABLE 1

| @mention | Sender | Recipient | Message Status | Message Body | Timestamp | Float ID |
|---|---|---|---|---|---|---|
| 1 | A | B | Open (blink) | How did yesterday's meeting turn out? | yyyy/mm/dd hh:mm:ss | 1AB |

In block 308, the system distributes the mention message to the members of the group chat. The message body, for example, is displayed within a group chat window of the device of each member.

In block 310, a callout is displayed on a scroll control within a group chat window of the mentioned user. For example, a callout is displayed on the scroll control of the group chat window of user B. The callout is positioned on the scroll control of the group chat window of user B at a location that corresponds to the location of the mention message in the transcript of the group chat. Further, the callout may include an indication, e.g., an initial or the like, of the mentioning member, e.g., user A.

In one aspect, the system is capable of instructing the device of user B to generate and display the callout. In another aspect, the device of user B is capable of processing the received mention message and, in response to detecting the mention of user B therein (as opposed to being directed to another different member), generate the callout. An example of a callout is shown as callout 140 of FIG. 1. In particular, the message from user A is displayed in the group chat window among the other messages in chronological order and callout 140 is displayed on the scroll control of group chat window 135 of user B. Callout 140 may be made to blink per the status shown in Table 1. Further, a color of callout 140 may indicate that the callout is new or represents an open conversation.

It should be appreciated that the various visual effects described herein such as color, blinking, and the like may vary based upon implementation. Still, each of the visual effects may be used to indicate a particular status of the mention message (or conversation as the case may be).

In block 312, an input from the mentioned member selecting the callout is received. For example, the system is capable of receiving an input from user B selecting the callout 140. In another example, the device of the mentioned member is capable of receiving the input.

In block 314, the body of the mention message is displayed within the callout with a UI element. The UI element is configured to receive a message from the mentioned member as a reply to the mention message. In one aspect, the callout is modified by the device of the user in response to the input received in block 312. In another aspect, the system causes the device of the mentioned member to modify the callout as described in response to the user input received in block 312. In one embodiment, the UI element is a control to reply to the mention message. For example, in response to user B positioning a pointer to hover over callout 140, the appearance of callout 140 is changed to include the body of the mention message and one or more UI elements.

Figure 4:
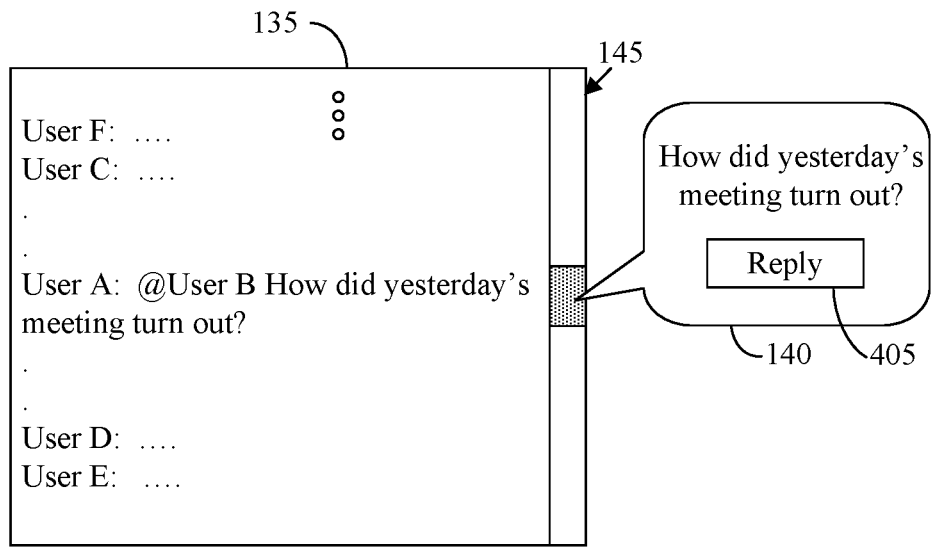
FIG. 4 illustrates an example group chat window and callout.

FIG. 4 illustrates an example of callout 140 as modified in response to the user input of block 312 to display the body of the mention message and UI control 405. In the example of FIG. 4, UI control 405 is a reply button. Further, in the example of FIG. 4, in response to user B selecting callout 140, group chat window 135 automatically scrolls to the location of the mention message within the transcript of the group chat. Group chat window 135 may be scrolled to the location of the mention message under control of the device of user B or under control of the system.

In block 316, the system receives a message from the mentioned member in reply to the mention message. For example, the system receives a message from user B in reply to the mention message from user A. In one aspect, user B may select the reply control element 405. In response to selection of reply control element 405, the device of user B displays a text box within callout 140. User B is able to enter a message that is a direct reply to the mention message within the provided text box. In another embodiment, the system causes the callout to display the text box within callout 140.

Figure 5:
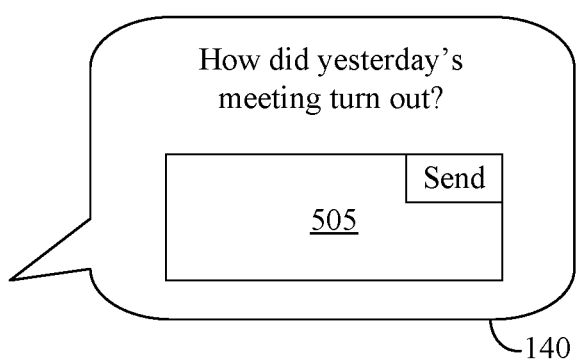
FIG. 5 illustrates an example callout.

FIG. 5 illustrates an example of callout 140 as modified in response to user B selecting UI control 405. As pictured, callout 140 includes a text box 505. FIG. 5 illustrates that in response to a selection of UI control 405, callout 140 is modified to include a text box 505 through which user B may enter text of a message in reply to the mention message. A "send" control may be included in callout 140. In response to selection of the send control, the device of user B sends the text within text box 505 as a message to the system.

In block 318, the system updates the record for the mention message. For example, the system recognizes the received message from the mentioned member as a reply to the mention message. Table 2 below illustrates an example entry created by the system in response to receiving the message from user B in reply to the mention message. The example entry of Table 2 may be appended to the record illustrated in Table 1, for example.

TABLE 2

| @mention | Sender | Recipient | Message Status | Message Body | Timestamp | Float ID |
|---|---|---|---|---|---|---|
|  | B | A | Response (blink) | <text of response from user B> | yyyy/mm/dd hh:mm:ss |  |

In block 320, the system distributes the message to the members of the group chat. For example, the system distributes the message from user B sent in reply to the mention message to the members of the group chat. Accordingly, the message from user B is displayed within the group chat window of each member of the group chat. The message is displayed in chronological order among the other messages of the transcript of the group chat.

In block 322, a callout is displayed on the scroll control of the group chat window of the mentioning member. For example, a callout is displayed on the scroll control of the group chat window of user A. In one aspect, the callout that is displayed in block 322 is displayed in response to the message from the mentioned member (e.g., user B) sent in reply to the mention message. The system, for example, causes the device of user A to display the callout by providing instructions to display the callout accompanying the message from user B. The message may include data that indicates that the message from user B is a reply to the mention message originally sent by user A. The device of user A may process the message from user B and, in response to processing the message and identifying any instructions included therein, display the callout.

Figure 6:
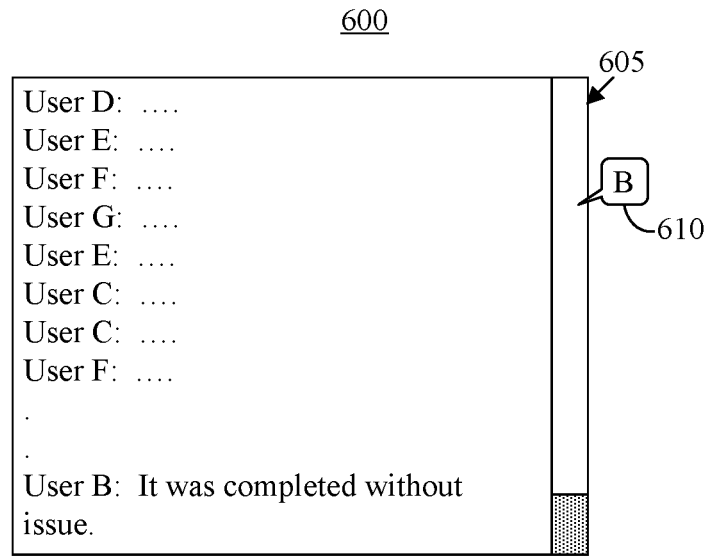
FIG. 6 illustrates another example group chat window and callout.

FIG. 6 illustrates an example group chat window 600 for user A after implementation of block 322. As pictured, group chat window 600 is displayed by the device of user A. Group chat window 600 includes a scroll control 605. Callout 610 is located on scroll control 605. Callout 610 is placed at a location on scroll control 605 corresponding to the location of the mention message within the chronologically ordered plurality of messages of the group chat. As pictured, the reply from user B is displayed within group chat window 600. Callout 610 indicates to user A that user B provided the reply to the mention message. For example, an initial, username, or the like may be included in the callout. In FIG. 6, callout 610 includes a "B" indicating that user B has provided a message in reply to the mention message.

FIG. 6 illustrates that a plurality of messages may have been posted by members of the group chat between the time that the mention message is posted and the time that a message in reply to the mention message is posted. In one aspect, callout 610 is displayed on group chat window 600 in response to receiving a message from user B in reply to the mention message. In one or more embodiments, callout 610 may be made to indicate state of the conversation. In this example, callout 610 indicates that a reply is received for the mention message. For example, callout 610 may be made to flash, blink, or otherwise be visually distinguished from other callouts that may be displayed on group chat window 600 to indicate the status change to the conversation corresponding to callout 610.

In block 324, the view of the group chat window of the mentioning member is scrolled automatically to display the mention message in response to a selection of the callout. In addition, the callout is automatically updated to show a current state of the conversation with one or more UI elements. The device of the mentioning user performs the operations of block 324. In one aspect, the device of the mentioning user performs the operations in response to instructions sent from the system.

For example, in response to selection of callout 610 by user A, the view of group chat window 600 is scrolled backwards through the chronologically ordered messages so that the mention message is displayed within group chat window 600. In one or more embodiments, the mention message may be positioned within group chat window 600 so that a message above and/or below is also displayed. In addition, in response to the selection of callout 610, callout 610 is modified to specify the mention message, the reply to the mention message, and one or more UI elements.

Figure 7:
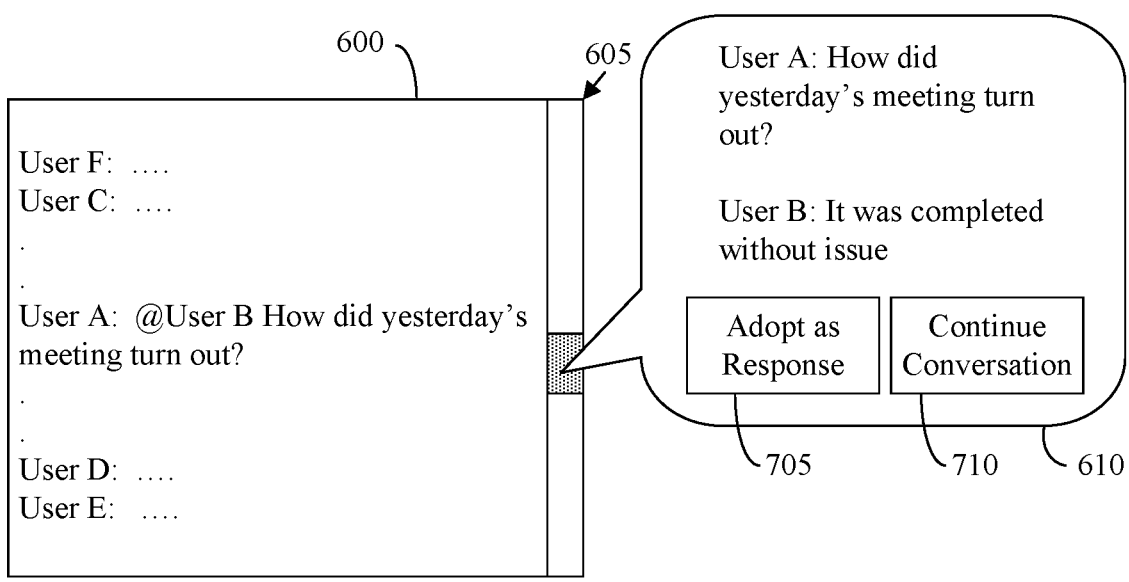
FIG. 7 illustrates another example group chat window and callout.

FIG. 7 illustrates an example of callout 610 from performing block 324. As pictured, callout 610 is modified to list the mention message, a message sent in reply to the mention message from user B, an adopt as response control 705, and a continue conversation control 710.

In block 326, the system determines whether to continue the conversation started with the mention message. For example, user A may select either adopt as response control 705 or continue conversation control 710. In response to a selection of adopt as response control 705, the message from user B sent in reply to the mention message is considered a response which closes the open conversation. In that case, method 300 continues to block 328 where the system updates the record for the mention message to indicate that the message from user B is accepted as a response to the mention message and to update the status of the conversation as closed.

Table 3 below illustrates an example entry that the system may make in performing block 328. The entry indicates that the conversation initiated by the mention message is closed. It should be appreciated that the entries illustrated in Tables 1-3 may be made consecutively thereby showing the evolution in status of the conversation within the system. In one or more embodiments, the system is capable of informing the devices of members of the changing status of conversations. The system may inform the devices of the changing status in real time.

TABLE 3

| @mention | Sender | Recipient | Message Status | Message Body | Timestamp | Float ID |
| --- | --- | --- | --- | --- | --- | --- |
|  | A | B | Close (blue) |  | yyyy/mm/dd hh:mm:ss |  |

For example, each device displaying callouts for the conversation may visually distinguish those callouts that do not have a response from callouts that have responses. Further, the callouts for open conversations may be visually distinguished from callouts for closed conversations. For example, in response to user A selecting adopt as response control 705, the system is notified of the acceptance of the response, marks the conversation closed by storing an entry for the conversation as illustrated in Table 3, and instructs the device of user A to change the color of callout 610 to blue to indicate that the conversation represented by callout 610 is now closed. The color of callout 140 for user B may also be changed to blue to indicate that the conversation is closed.

Table 4 illustrates the cumulative entries of Tables 1-3 as generated by the system in tracking the conversation described in connection with FIG. 3.

TABLE 4

| @mention | Sender | Recipient | Message Status | Message Body | Timestamp | Float ID |
|---|---|---|---|---|---|---|
| 1 | A | B (blink) | Open | How did yesterday's meeting turn out? | yyyy/mm/dd hh:mm:ss | 1AB |
| | B | A (blink) | Response | <text of response from user B> | yyyy/mm/dd hh:mm:ss | |
| | A | B (blue) | Close | | yyyy/mm/dd hh:mm:ss | |

FIG. 3B continues with block 330 in the case where the conversation continues. For example, in response to user A selecting continue conversation control 710 in FIG. 7, method 300 continues to block 330. In block 330, in response to a selection of continue conversation control 710, the callout displayed in the group chat window of the mentioning member is changed to include a UI element adapted to receive a response. For example, callout 610 is changed in response to the selection of continue conversation control 710 to display a text box. User A is able to enter a message in the text box in reply to the message received from user B. User A may enter a message into the text box to respond to the message "It was completed without issue" from user B, thereby continuing the conversation initiated by the mention message.

Figure 8:
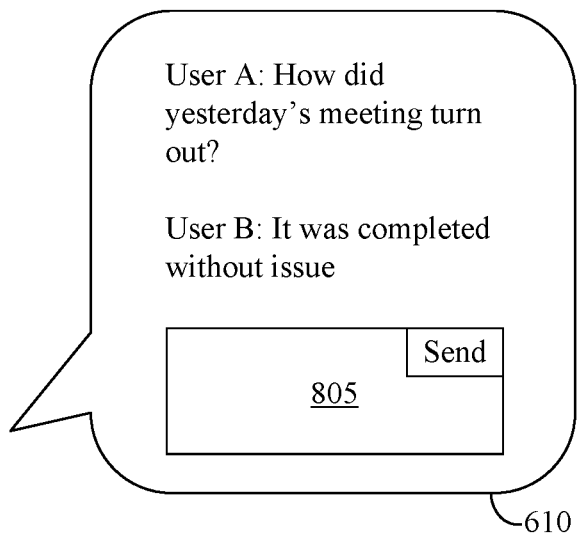
FIG. 8 illustrates another example callout.

FIG. 8 illustrates an example of callout 610 in response to a selection of continue conversation control 710. As shown, callout 610 is modified to include the mention message, the response from user B, and a text box 805. User A may enter the text "It seems that it happened again" into text box 805 to continue the conversation.

In block 332, the system receives the message from the mentioning member. For example, the system receives the message entered into text box 805. In response to user A selecting a send button located within callout 610, the device of user A sends the message entered within callout 610 to the system. The system receives the message and recognizes the message as a continuation of the conversation started with the mention message from user A.

In block 334, the system updates the mention message record. For example, the system generates another entry indicating that user A has sent a message to user B thereby continuing the same conversation started with the mention message and indicating that the conversation remains open.

In block 336, the system distributes the message from the mentioning member to the other members of the group chat. Accordingly, the message from the mentioning member, e.g., user A, is displayed within the group chat window of each other member of the group chat.

In block 338, the callout of the mentioned member for the conversation visually indicates that a message from the mentioning member has been received. For example, callout 140 displayed on the scroll control of group chat window 135 of user B is made to blink. Callout 140 is made to visually indicate to user B that the conversation is ongoing, e.g., has not been closed, and that a further message from user A has been received in continuance of the conversation.

After block 338, method 300 may continue to block 312 to continue processing generally as described to continue the conversation until closed. In performing blocks 312 and 314, callout 140, in response to a selection by user B, may display a current state of the conversation and a UI element. It should be appreciated that as the conversation continues, the system continues to update the record for the mention message to indicate status and visual effects to be applied to callouts to indicate status. The status and instructions to change callouts may be propagated to the devices of relevant members as the conversation continues.

Figure 9:
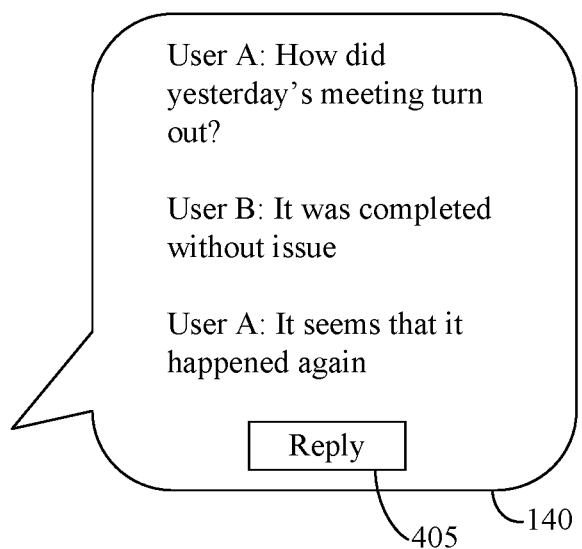
FIG. 9 illustrates another example callout.

FIG. 9 illustrates an example of callout 140 showing the state of the conversation subsequent to performing blocks 310 and 312 as part of another round of communication. As pictured, UI control 405 is again included. Callout 140 includes the mention message from user A, the reply to the mention message from user B, and the latest reply in the conversation from user A. Further, in response to user B selecting callout 140, the view presented in group chat window 135 may be automatically scrolled to the location in the transcript where the mention message is located.

FIG. 3 illustrates an example where a conversation takes place between two members of a group chat within the larger or broader discussion taking place. The described method can continue until user A marks the conversation as closed by selecting the "adopt response" control element. It should be appreciated that upon a user sending a message through a callout or a hover action no longer taking place above a callout, the callout may be returned to an original state where the callout includes an identifier of a user. For example, callout 140 may return to the state illustrated in FIG. 1 subsequent to user B sending a message through callout 140 or a hover action no longer being detected.

Figure 10:
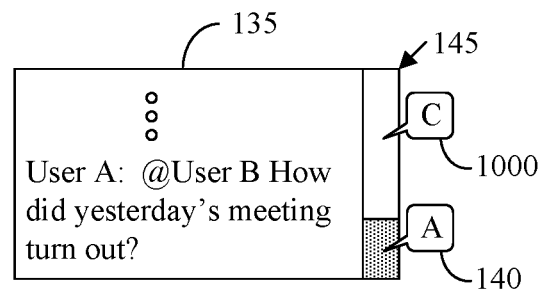
FIG. 10 illustrates an example group chat window with a plurality of callouts.

FIG. 10 illustrates an example group chat window with a plurality of callouts. In the example of FIG. 10, callout 140 and a callout 1000 are shown positioned on scroll control 145. In this example, a message from user A includes a mention of user B as indicated by callout 140. Further, a message from user C includes a mention of user B as indicated by callout 1000. The location of each of callouts 140 and 1000 on scroll control 145 represents or indicates the location of each respective mention message within the transcript for the group chat. The callouts may be displayed on the scroll control of a group chat window and arranged in chronological order. The callouts may include an indicator of the status of a conversation represented by the callout and the identity of the last or most recent member to participate or provide a message or comment in the conversation.

Figure 11:
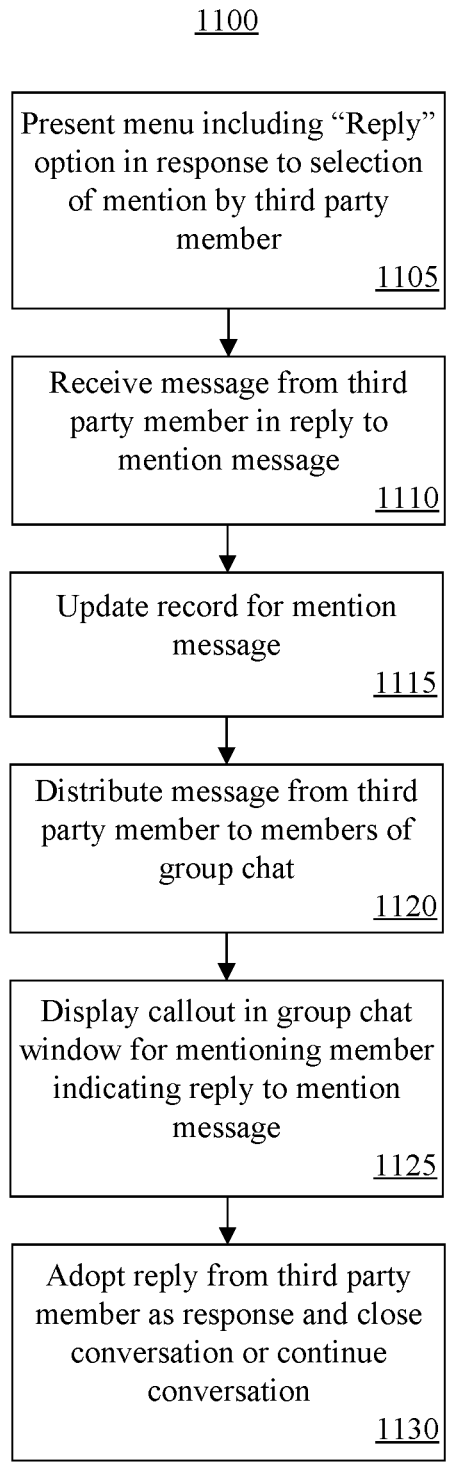
FIG. 11 illustrates another example method of group chat using mentions.

FIG. 11 illustrates another example method 1100 of group chat using mentions. Method 1100 may be performed by a system such as system 110 of FIG. 1. Whereas FIG. 3 illustrates usage of mentions between two members, e.g., the mentioning member and the mentioned member, method 1100 illustrates usage of mentions involving third party members of the group chat. As used herein, the term "third party member," as applied to a particular conversation, refers to a member of the group chat that did not author the mention message that started the conversation and that is not referenced by the mention message. The example of FIG. 11 illustrates a case where a third party member provides a message in response a mention message.

Method 1100 may begin in a state where a plurality of members are participating in a group chat. For example, user A, user B, and user C may be members of the group chat. User A may send a mention message referencing user B as described herein. Accordingly, a callout is displayed on the scroll control of the group chat window of user B. In this example, and for purposes of discussion relating to FIG. 1100, user C is considered a third party member since user C did not author or send the mention message and is not referenced by the mention message.

In block 1105, a window is presented. The window may be, or include, a menu having a "reply" option. The window may be presented in response to a selection of the mention within the mention message by a third party member. For example, user C may select the mention or tag of user B within the mention message shown in the group chat window of user C. In one aspect, user C may initiate a right click operation over the "@User B" portion of the mention message from user A as presented within the group chat window displayed on user C's device. In response to the right click operation, the device of user C presents a menu that may include a "Reply" option.

Figure 12:
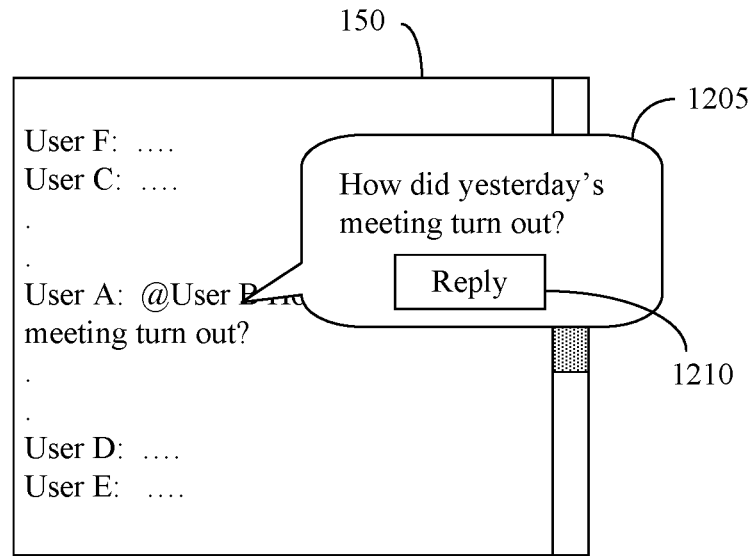
FIG. 12 illustrates another example group chat window.

FIG. 12 illustrates an example of a window that may be displayed in response to a selection of a mention in a mention message by a third party member of a group chat. As pictured, group chat window 150 is shown for user C. In response to a selection of the mention, a window 1205 is presented that includes a reply control 1210.

In block 1110, a message is received from the third party member in reply to the mention message. For example, in response to user C selecting reply control 1210, window 1205 is changed to include a text box. The text box is adapted to receive a message from user C as a reply to the mention message. Window 1205 may also include a send button. In response to selection of the send button, the text in the text box is sent to the system designated as a message in reply to the mention message. The system receives the message from the third party member. Further, the system recognizes the message as a reply to the mention message.

In block 1115, the system updates the record for the mention message. The system, for example, may make an entry for the record indicating that a message has been received from a third party member, e.g., user C. Further, the entry may indicate that the conversation started by the mention message remains open.

In block 1120, the system distributes the message from the third party member to members of the group chat. The message can be displayed in the group chat window of each of the members.

In block 1125, a callout is displayed in the group chat window of the mentioning member, e.g., user A, indicating that a reply to the mention message is received. For example, the device of user A, in response to receiving the message from user C, is capable of displaying callout 610 to indicate that a reply has been received. In one aspect, the system instructs the device of user A to change the appearance of callout 610 to indicate the current status of the conversation.

Figure 13:
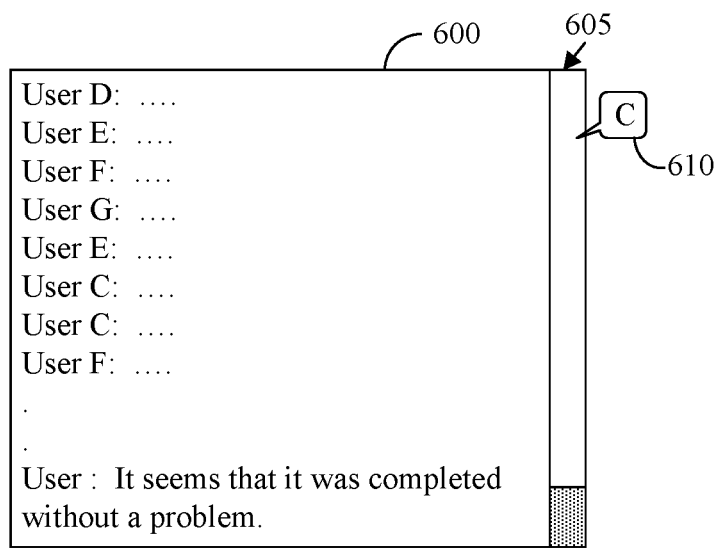
FIG. 13 illustrates another example group chat window and callout.

FIG. 13 illustrates an example of group chat window 600 where callout 610 is displayed and indicates that a message sent in response to the mention message has been received. As pictured, callout 610, which is positioned on scroll control 605 to correspond to the location of the mention message, includes a "C" indicating that the message received in reply to the mention message is from user C. Further, callout 610 may be made to blink or change color to indicate that a response to the mention message is available.

In block 1130, the message from the third party members is adopted as a response to close the conversation or the conversation continues, e.g., in an open state. For example, user A may select callout 610. Selection of callout 610 may cause callout 610 to display the mention message and the message from user C, e.g., the message from the third party member. Callout 610 may also display one or more UI elements, e.g., adopt as response control 705 and continue conversation control 710, that allow user A to either adopt the message from the third party member or to continue the conversation (e.g., where the message is not adopted).

It should be appreciated that the system may update the record for the mention message to indicate the current status of the conversation. The update may be an entry indicating whether the message is adopted for the mention message thereby closing the conversation or the conversation remains open. The system is capable of sending status updates to the devices of users A, B, and C which cause the callouts displayed in the respective group chat windows to change appearance to indicate the current status of the conversation, e.g., as closed, open, etc.

Table 5 illustrates an example record for a conversation corresponding to a mention message. Table 5 illustrates example entries corresponding to the example illustrated in FIG. 11.

TABLE 5

| @mention | Sender | Recipient | Response | Message Status | Message Body | Timestamp | Float ID |
|---|---|---|---|---|---|---|---|
| 1 | A (*1) | B | | Open (Blink) | How did yesterday's meeting turn out? | yyyy/mm/dd hh:mm:ss | 1AB |
| | C (*2) | A, B | C | Response (Blink) | It was completed without a problem | yyyy/mm/dd hh:mm:ss | |

TABLE 5-continued

| @mention | Sender | Recipient | Response | Message Status | Message Body | Timestamp | Float ID |
|---|---|---|---|---|---|---|---|
| | A (*3) | B | | Close (Blue) | | yyyy/mm/dd hh:mm:ss | |

In response to user A making a mention of user B, the system creates an entry including the information in row 1 (indicated by "1" in the sender column). The entry indicates that the mention message (mentioning user B) triggers a callout with the status of "Open" in the group chat window for user B to be displayed. The status "blink" indicates the type of visual effect applied to the callout.

In response to user C right clicking on the mention as displayed within the group chat window for user C and providing a message in response, the system updates the record for the mention message with the information in row 2 (indicated by "*2" in the sender column). The entry indicates that the status of the conversation is "Response." Further, the entry indicates that the status of the conversation, and thus, callout, is set to "blink."

In response to user A accepting the message from user C as a response to the mention message, the system updates the record for the mention message with the information in row 3 (indicated by "*3" in the sender column). As shown, the status of the conversation is updated to "Closed." Further, the status of the callout is changed to "blue" to indicate the closed status of the conversation.

Figure 14:
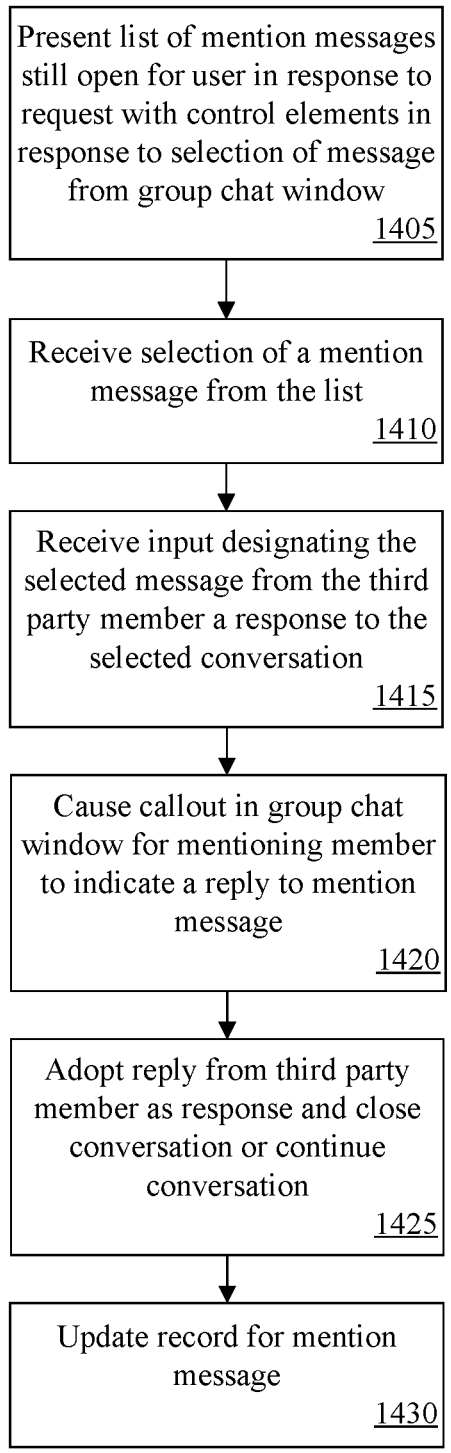
FIG. 14 illustrates another example method of group chat using mentions.

FIG. 14 illustrates another method 1400 of group chat using mentions. Method 1400 may be performed by a system such as system 110 of FIG. 1. FIG. 14 illustrates an example where a message provided by a third party is accepted as a response to close a conversation started from a mention message.

Method 1400 may begin in a state where a plurality of members are participating in a group chat. For example, user A, user B, and user C may be members of the group chat. User A may send a mention message specifying or referencing user B as described herein. In this example, and for purposes of discussion relating to FIG. 14, user C is considered a third party member. In the example of FIG. 14, user C has posted a message. The message from user C, however, is not posted directly as a reply to the mention message as described in connection with FIG. 11. Rather, the message is posted within the group chat and is unaffiliated with the conversation between user A and user B. In this example, user B wishes to designate the message provided by user C, e.g., the third party member, as a response to the mention message from user A.

In block 1405, a list of mention messages referencing a particular user is presented in response to a request. For example, user B is able to select a message from a third party member. In this example, user B may select, e.g., right click, the message sent by user C from within group chat window 135. In response thereto, the device of user B presents a list of open conversations referencing user B. In one aspect, a list of mention messages referencing user B that are still open is displayed. In one aspect, the system may receive the request from user B and, in response thereto, instruct the device of user B to display the list of mention messages.

In block 1410, a selection of a mention message from the list of open conversations (e.g., mention messages) is received. In one aspect, the device of user B receives the selection. In another aspect, in response to receiving the selection, the device of user B forwards the selection to the system. For example, in response to user B selecting the mention message from user A within the list, the device of user B receives the selection. The device of user B is capable of sending the selection to the system.

Figure 15:
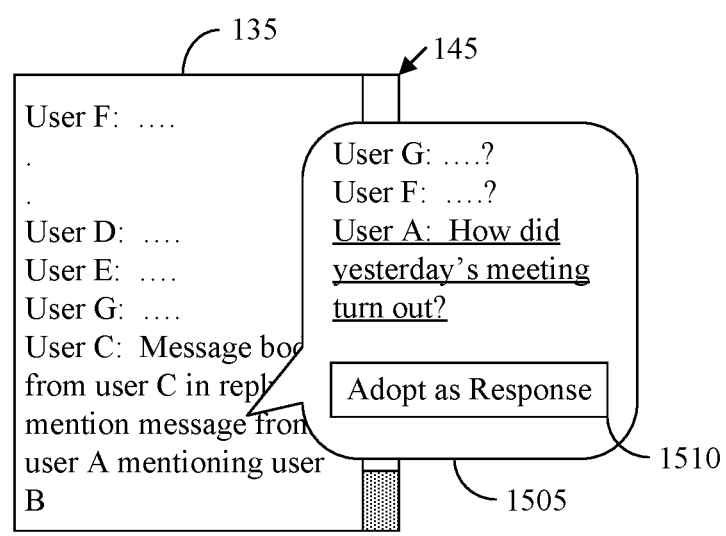
FIG. 15 illustrates another example group chat window.

FIG. 15 is an example of group chat window 135 for user B with a window 1505 showing a list of open conversations mentioning user B. In this example, user B has selected the message from user B and indicated that the message is to be designated as a response to a mention message. Window 1505, in response, is displayed and lists three open conversations for user B. The first open conversation corresponds to a mention message from user G mentioning user B. The second open conversation corresponds to a mention message from user F mentioning user B. The third open conversation corresponds to the mention message from user A mentioning user B. In the example of FIG. 15, user B has selected the mention message, e.g., the conversation, from user A. The selected mention message is shown by underline. In one aspect, in response to selection of the mention message from user A, window 1505 displays UI element 1510.

In block 1415, the system receives an input designating the selected message as a response to the selected conversation. For example, user B may select UI element 1510, e.g., the adopt as response control. In response to selecting UI element 1510, the device of user B notifies the system that the message from user C, e.g., the third party member, has been selected by user B as a response to the mention message from user A. It should be appreciated that window 1505 may include a cancel option or query the user as to whether user B intends on designating the message from user C as a response to the mention message from user A prior to proceeding.

In block 1420, a callout in the group chat window for the mentioning member indicates that a reply to the mention message has been received. For example, callout 610 may be displayed on scroll control 605 of group chat window 600 of user A to indicate that a reply to the mention message of user A has been received. Callout 610 may be located at a position on scroll control 605 corresponding to the location of the mention message within the transcript of the group chat.

In block 1425, the system determines whether the message from the third party member is adopted as a response to close the conversation or whether the conversation remains open. In this example, user A, as the originator or the mention message, is able to determine whether the message from user C, as proposed by user B, is accepted as a response to close the conversation.

For example, in response to user A selecting callout 610, callout 610 may be modified to display the mention message, the response from user C proposed as a response by user B, and one or more UI elements allowing user A to adopt the response or continue the conversation as described. Further, selection of callout 610 causes group chat window 600 to automatically scroll to the location within the transcript of the group chat corresponding to the mention message so that the mention message is displayed within group chat window 600 in addition to callout 610.

In block 1430, the system is capable of updating the record of the mention message. The system, for example, updates the record for the mention message based upon whether user A adopts the response or chooses to continue the conversation. In any case, the record of the mention message may indicate that the message from user C was proposed as a response by user B to the mention message of user A and the status (e.g., as open or closed). Further, the system may send instructions to the devices of users A, B, and C to update the status of the conversation and/or to change the appearance of any callouts displayed within the group chat windows of users A, B, and/or C.

Table 6 illustrates an example record for a conversation corresponding to a mention message. Table 6 illustrates example entries corresponding to the example illustrated in FIG. 14.

users A, B, and C are changed to blue indicating acceptance of the message as a response closure of the conversation.

In one or more embodiments, the present invention can operate in cooperation with an external system or database. For example, when a reference number is included in the body of a message, the system may create link to a record in the external system represented by the reference number. Accordingly, in response to a user selecting the control number, the link may be executed or activated. In one or more embodiments, the system may convert the reference number to a link only within a mention message.

In one or more embodiments, operations described and attributed to devices may be performed by the device under the control or direction of the system. For example, the system may provide instructions with messages, may include instructions embedded within such messages, or the like. The instructions may indicate status, correlations among messages (e.g., which messages are part of a given conversation), etc. The devices may perform the operations in response to receiving the instructions.

The terminology used herein is for the purpose of describing particular embodiments only and is not intended to be

TABLE 6

| @mention | Sender | Recipient | Response | Message Status | Message Body | Timestamp | Float ID |
|---|---|---|---|---|---|---|---|
| 1 | A (*1) | B | | Open (blink) | How did yesterday's meeting turn out? | yyyy/mm/dd hh:mm:ss | 1AB |
| | B (*2) | A, C | C | Response (blink) | It was completed without a problem | yyyy/mm/dd hh:mm:ss | |
| | A (*3) | B, C | | Close (blue) | | yyyy/mm/dd hh:mm:ss | |

In response to user A making a mention of user B, the system creates an entry including the information in row 1 (indicated by "1" in the sender column). The entry indicates that mention message (mentioning user B) causes a callout with the status of "Open" in the group chat window for user B to be displayed. The status "blink" indicates the type of visual effect applied to the callout.

In response to user B selecting the message of user C displayed in the group chat and designating the message as a response to the mention message from user A, the system updates the record for the mention message with the information in row 2 (indicated by "*2" in the sender column). The entry indicates that the status of the conversation is "Response." Further, the entry indicates that the status of the conversation, and thus, callout, is set to "blink." Accordingly, the callouts are displayed in the group chat windows of users A, B, and C with a blinking effect. When users A, B, and C click on a respective callout, the content of the reply is displayed in the callout. As discussed, the callouts further may display the current state of the conversation, e.g., the mention messages and each other message of the conversation.

In response to user A accepting the message from user C as a response to the mention message, the system updates the record for the mention message with the information in row 3 (indicated by "*3" in the sender column). As shown, the status of the conversation is updated to "Closed." Further, the status of the callout is changed to "blue" to indicate the closed status of the conversation. Accordingly, the callouts displayed for the conversation in the group chat windows of limiting. Notwithstanding, several definitions that apply throughout this document now will be presented.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," or similar language mean that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

As defined herein, the term "output" means storing in physical memory elements, e.g., devices, writing to display or other peripheral output device, sending or transmitting to another system, exporting, or the like.

As defined herein, the term "processor" means at least one hardware circuit configured to carry out instructions. The instructions may be contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

The terms first, second, etc. may be used herein to describe various elements. These elements should not be limited by these terms, as these terms are only used to distinguish one element from another unless stated otherwise or the context clearly indicates otherwise.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of group chat communication, comprising:
receiving, using a processor, a first message in a group chat having members, wherein the first message is from a first member of the group chat and specifies a second member of the group chat;
distributing, using the processor, the first message to the members of the group chat; and
in response to receiving the first message and using the processor, causing a group chat window of the second member to display a first callout;
wherein the group chat window of the second member is configured to display a plurality of chronologically ordered messages posted by the members of the group chat, wherein the first callout identifies the first member and indicates a position of the first message within the plurality of chronologically ordered messages, and wherein a selection of the first callout causes the first callout to display, within the first callout, the message and the selection of the first callout causes the first callout to display, within the first callout, a user interface element configured to receive a reply to the first message.

2. The method of claim 1, wherein a selection of the first callout automatically scrolls the group chat window of the second member to the position of the first message within the plurality of chronologically ordered messages to display the first message.

3. The method of claim 1, wherein the first callout is positioned on a scroll control of the group chat window of the second member at a location on the scroll control that indicates the position of the first message within the plurality of chronologically ordered messages.

4. The method of claim 1, further comprising:
receiving a second message from a third member of the group chat, wherein the second message is a reply to the first message and is entered into a text box presented in response to a selection of a tag of the second member within the first message within a group chat window of the third member; and
causing display of a second callout on a scroll control of a group chat window of the first member to visually indicate that a reply to the first message is received, wherein the second callout is at a location of the scroll control of the group chat window of the first member indicating the position of the first message within the plurality of chronologically ordered messages.

5. The method of claim 4, further comprising:
in response to an acceptance of the second message as a response to the first message, indicating a change in status of the first message using the first callout and the second callout.

6. The method of claim 1, further comprising:
receiving a second message from the second member, wherein the second message is entered through a user interface element presented within the first callout, wherein the second message is a reply to the first message; and
in response to receiving the second message, causing a second callout to be displayed on a scroll control of a group chat window of the first member, wherein the second callout is at a location of the scroll control of the group chat window of the first member indicating the position of the first message within the plurality of chronologically ordered messages.

7. The method of claim 6, further comprising:
in response to an acceptance of the second message as a response to the first message, indicating a change in status of the first message using the first callout and the second callout.

8. The method of claim 6, wherein a text box is provided in the second callout in response to a selection of the second callout, the method further comprising:
in response to receiving a third message from the first member entered through the text box provided in the second callout, distributing the third message to the members of the group chat and causing the first callout of the group chat window of the second member to visually indicate the third message being provided as a reply to the second message.

9. A system for group chat communication, comprising:
a processor configured to initiate executable operations including:
receiving a first message in a group chat having members, wherein the first message is from a first member of the group chat and specifies a second member of the group chat;
distributing the first message to the members of the group chat; and
in response to receiving the first message, causing a group chat window of the second member to display a first callout;
wherein the group chat window of the second member is configured to display a plurality of chronologically ordered messages posted by the members of the group chat, wherein the first callout identifies the first member and indicates a position of the first message within the plurality of chronologically ordered messages, and wherein a selection of the first callout causes the first callout to display, within the first callout, the message and the selection of the first callout causes the first callout to display, within the first callout, a user interface element configured to receive a reply to the first message.

10. The system of claim 9, wherein a selection of the first callout automatically scrolls the group chat window of the second member to the position of the first message within the plurality of chronologically ordered messages to display the first message.

11. The system of claim 9, wherein the first callout is positioned on a scroll control of the group chat window of the second member at a location on the scroll control that indicates the position of the first message within the plurality of chronologically ordered messages.

12. The system of claim 9, wherein the processor is configured to initiate executable operations further including:
receiving a second message from a third member of the group chat, wherein the second message is a reply to the first message and is entered into a text box presented in response to a selection of a tag of the second member within the first message within a group chat window of the third member; and
causing display of a second callout on a scroll control of a group chat window of the first member to visually indicate that a reply to the first message is received, wherein the second callout is at a location of the scroll control of the group chat window of the first member indicating the position of the first message within the plurality of chronologically ordered messages.

13. The system of claim 12, wherein the processor is configured to initiate executable operations further including:
in response to an acceptance of the second message as a response to the first message, indicating a change in status of the first message using the first callout and the second callout.

14. The system of claim 9, wherein the processor is configured to initiate executable operations further including:
receiving a second message from the second member, wherein the second message is entered through a user interface element presented within the first callout, wherein the second message is a reply to the first message; and
in response to receiving the second message, causing a second callout to be displayed on a scroll control of a group chat window of the first member, wherein the second callout is at a location of the scroll control of the group chat window of the first member indicating the position of the first message within the plurality of chronologically ordered messages.

15. The system of claim 14, wherein the processor is configured to initiate executable operations further including:
in response to an acceptance of the second message as a response to the first message, indicating a change in status of the first message using the first callout and the second callout.

16. The system of claim method of claim 14, wherein a text box is provided in the second callout in response to a selection of the second callout, wherein the processor is configured to initiate executable operations further including:
in response to receiving a third message from the first member entered through the text box provided in the second callout, distributing the third message to the members of the group chat and causing the first callout of the group chat window of the second member to visually indicate the third message being provided as a reply to the second message.

17. A computer program product for group chat communication, the computer program product comprising a computer readable storage medium having program instructions embodied therewith, the program instructions executable by a processor to cause the processor to initiate operations comprising:
receiving, using the processor, a first message in a group chat having members, wherein the first message is from a first member of the group chat and specifies a second member of the group chat;
distributing, using the processor, the first message to the members of the group chat; and
in response to receiving the first message and using the processor, causing a group chat window of the second member to display a first callout;
wherein the group chat window of the second member is configured to display a plurality of chronologically ordered messages posted by the members of the group chat, wherein the first callout identifies the first member and indicates a position of the first message within the plurality of chronologically ordered messages, and wherein a selection of the first callout causes the first callout to display, within the first callout, the message and the selection of the first callout causes the first callout to display, within the first callout, a user interface element configured to receive a reply to the first message.

18. The computer program product of claim 17, wherein a selection of the first callout automatically scrolls the group chat window of the second member to the position of the first message within the plurality of chronologically ordered messages to display the first message.

19. The computer program product of claim 17, wherein the first callout is positioned on a scroll control of the group chat window of the second member at a location on the scroll control that indicates the position of the first message within the plurality of chronologically ordered messages.

20. The computer program product of claim 17, the operations further comprising:
receiving a second message from the second member, wherein the second message is entered through a user interface element presented within the first callout, wherein the second message is a reply to the first message; and
in response to receiving the second message, causing a second callout to be displayed on a scroll control of a group chat window of the first member, wherein the second callout is at a location of the scroll control of the group chat window of the first member indicating the position of the first message within the plurality of chronologically ordered messages.

* * * * *